Aug. 14, 1962 W. KALIDE 3,049,106
SUPERHEAT TEMPERATURE CONTROLLING STEAM SUPERHEATER
Filed July 28, 1958
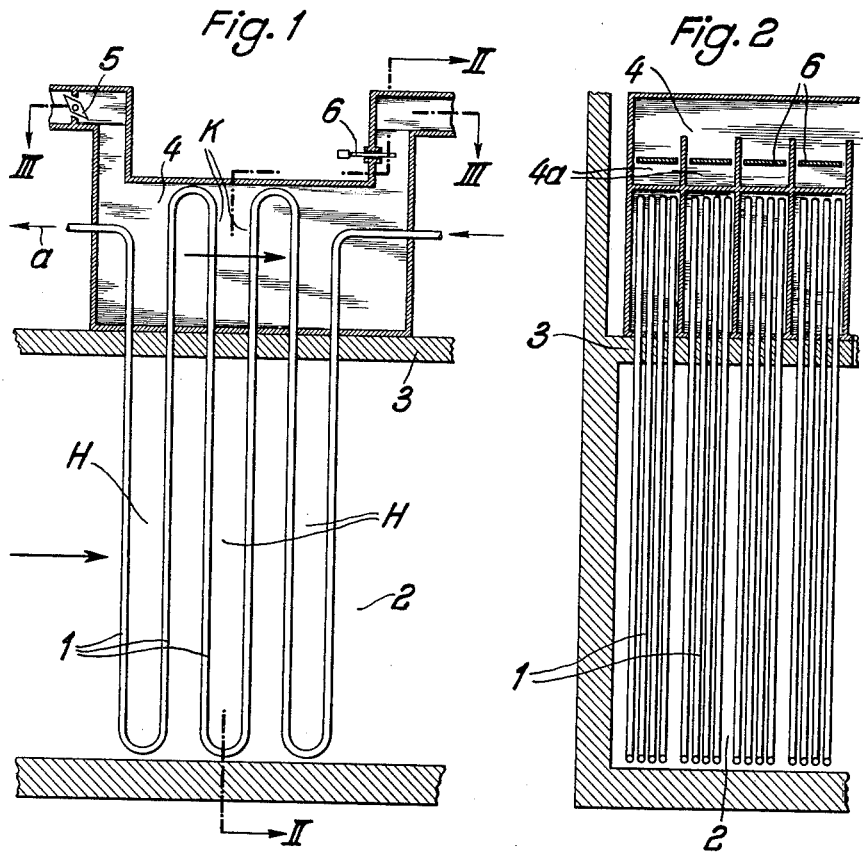
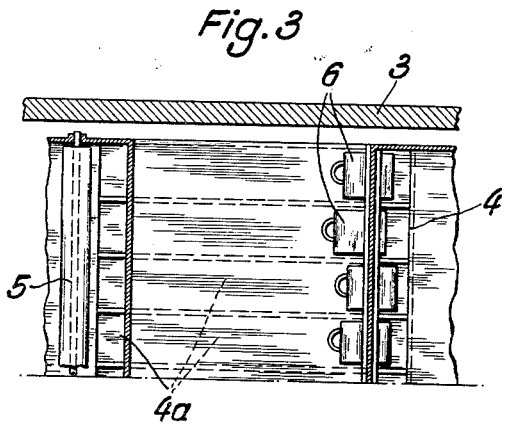
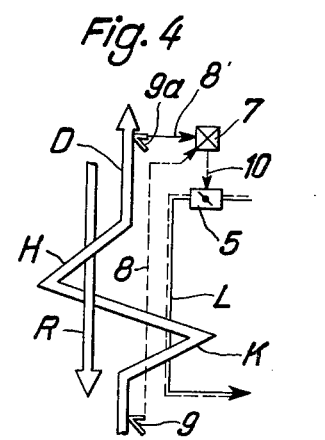
Inventor:
WOLFGANG KALIDE
by K. A. Mayr
ATTORNEY 3,049,106
SUPERHEAT TEMPERATURE CONTROLLING STEAM SUPERHEATER
Wolfgang Kalide, Neuss (Rhine), Germany, assignor to Sulzer Freres, Societe Anonyme, Winterthur, Switzerland, a corporation of Switzerland
Filed July 28, 1958, Ser. No. 751,499
Claims priority, application Germany Aug. 3, 1957
3 Claims. (Cl. 122—459)

The present invention relates to a novel superheater for steam generators which superheater is particularly adapted to control and maintain the temperature of the superheated steam.

Apparatuses have been proposed for controlling the temperature of the steam superheated in a superheater by injecting water or steam into the superheated steam or by cooling the surface of the superheater tubes by means of a liquid or a gaseous coolant. These last mentioned surface heat exchangers are located outside of the walls of the steam generator and their tubes are connected with a portion of the superheater tubes which are located within the space confined by the walls of the steam generator and which tubes are heated by combustion gas. These conventional apparatuses have the disadvantage that they are interposed between two superheater sections, i.e. are placed upstream of a final superheater section which is heated by products of combustion so that the steam is subjected to uncontrollable influences after its temperature has been adjusted in the heat exchanger provided for this temperature control. The temporal behavior of the control operation is therefore very poor. The disadvantage cannot be satisfactorily overcome by arranging an injection or surface cooler at the end of the last superheater section. In that case the steam generator must be so operated that the temperature of the steam leaving the superheater is considerably higher than the desired live steam temperature. This necessitates the use of special tube material which considerably increases the cost of the steam generator and superheater. In addition, a surface cooler must have cooling surfaces which are so large as to render the apparatus uneconomical.

It is an object of the present invention to provide a steam superheater in a steam generator which superheater affords satisfactory control of the superheat temperature whereby the disadvantages inherent of conventional devices for this purpose are avoided. In the superheater according to the invention each tube of the final superheater section, i.e. the section through which the steam flows last prior to being discharged from the steam generator, has a portion located within the space formed by the walls of the steam generator and is heated by combustion gas in said space and has a portion extending through a wall of the steam generator and being located outside of the space enclosed by the walls of the steam generator. The last mentioned portions are placed within a duct through which a coolant flows. The steam flowing through the superheater tubes is, therefore, alternately subjected to heating and cooling. Since there is no superheater section downstream of the aforedescribed apparatus the control of the temperature of the superheated steam leaving the steam generator is not subjected to delays as is the case in the conventional apparatuses.

It is of advantage to subdivide the duct conducting the coolant into a plurality of conduits through which the coolant flows in parallel relation, each of the conduits receiving portions of superheater tubes which are connected in series relation with respect to steam flow, and each of the conduits being provided with an individual flow control means for the coolant. In this way superheater tube lines which are exposed to different heating by the combustion gases can be subjected to different cooling by the coolant for obtaining a uniform superheat temperature at the outlet of all superheater tube lines.

The novel features which are considered characteristic of the invention are set forth with particularity in the appended claims. The invention itself, however, and additional objects and advantages thereof will best be understood from the following description of an embodiment thereof when read in connection with the accompanying drawing in which:

FIG. 1 is a diagrammatic side elevation of a superheater arrangement according to the invention.

FIG. 2 is a diagrammatic vertical section of the superheater shown in FIG. 1, the section being made along line II—II of FIG. 1.

FIG. 3 is a horizontal section of the cooling portion of the superheater shown in FIG. 1, the section being made along line III—III of FIG. 1.

FIG. 4 is a diagram illustrating the flow of the heating agent, of the steam, of the coolant, and temperature control means in the superheater arrangement according to the invention.

Like parts are designated by like numerals in the different figures of the drawing.

Referring more particularly to the drawing numeral 1 designates superheater tubes connected by hairpin bends in series with respect to the steam flow. Each superheater tube has a portion H including a plurality of hairpin bends which portion is exposed to combustion gases flowing in a duct 2 confined by walls 3 of the steam generator. Each superheating tube has a portion K which is located outside of the duct 2 and includes a plurality of hairpin bends. The portions K of the superheater tubes are located in a duct 4 which is juxtaposed and adjacent to the duct 2 and through which a coolant flows which is controlled by a damper 5. The duct 4 is subdivided into a plurality of conduits $4a$ through which the coolant flows in parallel relation, each conduit containing portions of superheater tubes which are connected in series relation with respect to steam flow. Each conduit $4a$ is provided with an individual damper 6 for affording adjustment of the relative amounts and velocities of the coolant flowing through the individual conduits $4a$.

The steam flows through the superheater tubes 1 in the direction indicated by the arrow $a$ in FIG. 1. The coolant flows through the duct 4 in counterflow relation to the steam flowing through the superheater tubes. The coolant may be a gas, for example, air which may serve as preheated combustion air for the steam generator after leaving the cooling duct 4.

Without departing from the scope of the present invention the steam cooler and its control may be adapted to use a liquid coolant, for example, feed water which is preheated in the steam cooler prior to the supply of the feed water to the steam generator.

The arrow R in FIG. 4 indicates the flow of combustion gas. The zigzag line D in FIG. 4 indicates the flow of the steam in the apparatus according to the invention. The line L indicates the flow of the coolant through the apparatus according to the invention. The temperature of the steam entering the apparatus and the temperature of the steam leaving the apparatus is sensed by thermocouples 9 and $9a$, respectively, for actuating a regulator 7 to which the thermocouples are connected by pulse conduits 8 and 8'. The regulator 7 actuates the damper 5 to which it is connected by a conventional mechanism generally indicated by line 10.

The dampers 6 shown in FIGURES 1 and 3 are for the purpose of adjusting the relative flow of coolant through the individual conduits $4a$ to take care of different heating conditions of the superheater elements arranged in the individual conduits $4a$. These conditions are inherent to the steam generator design in connection with which the apparatus according to the invention is used. The dampers 6 must be adjusted only once to take care of these inherent conditions. Subsequent adjustment is only needed if these conditions change.

In steam generators which are provided with a plurality of superheaters an apparatus according to the invention may be used with each superheater or with only some of the superheaters to obtain the desired temperature control. The temperature regulating devices of the individual apparatuses may be interconnected, if desired, in order to obtain the desired final temperature of the steam.

What is claimed is:

1. A steam generator comprising a first duct conducting hot combustion gas, a second duct juxtaposed and adjacent to said first duct and conducting a coolant, and a final steam superheater through which the steam flows last prior to being discharged from the steam generator, said final superheater including a plurality of individual superheater tubes, said tubes being disposed in heat exchange relation to said first and second ducts to conduct steam through parallel flow paths last prior to being discharged from the steam generator, each of said tubes having a plurality of first portions located within said first duct for heating by the combustion gas flowing through said first duct, each of said tubes having a plurality of second portions interposed between said first portions with respect to the flow of steam through said tubes and located within said second duct to be cooled by the coolant flowing through said second duct, said portions of each of said tubes being connected in series relation, and means for controlling coolant flow through said second duct.

2. A steam generator as defined in claim 1 wherein each of said superheater tubes is shaped in serpentine fashion and the series connected portions consist of a plurality of straight parallel sections and hairpin bends interconnecting said straight parallel sections, a plurality of hairpin bends of each superheater tube being located in said first duct, a plurality of hairpin bends of each superheater tube being located in said second duct, and said straight sections individually having a segment located in said first duct and a segment located in said second duct.

3. A steam generator as defined in claim 1 wherein said second duct is subdivided into a plurality of conduits arranged in parallel relation with respect to the coolant flow therethrough, each of said conduits containing a plurality of said second portions of a plurality of said superheater tubes, and said means for controlling coolant flow including a control in each of said conduits for individually controlling the coolant flow through said conduits.

References Cited in the file of this patent

UNITED STATES PATENTS

| | | |
|---|---|---|
| 2,527,539 | Frisch | Oct. 31, 1950 |
| 2,623,507 | Brinig | Dec. 30, 1952 |
| 2,707,458 | Hayden | May 3, 1955 |

FOREIGN PATENTS

| | | |
|---|---|---|
| 616,653 | Germany | Aug. 2, 1935 |
| 633,361 | Great Britain | Dec. 12, 1949 |